(12) United States Patent
Altman (10) Patent No.: US 12,027,916 B2
(45) Date of Patent: Jul. 2, 2024

(54) DIRECT DRIVE OUTER ROTOR BRUSHLESS DC MOTOR DRIVE WHEEL

(71) Applicant: IAM ROBOTICS, LLC, Pittsburgh, PA (US)

(72) Inventor: Vladimir Altman, Pittsburgh, PA (US)

(73) Assignee: IAM Robotics, LLC, Pittsburgh, PA (US)

(*) Notice: Subject to any disclaimer, the term of this patent is extended or adjusted under 35 U.S.C. 154(b) by 460 days.

(21) Appl. No.: 17/390,275

(22) Filed: Jul. 30, 2021

(65) Prior Publication Data

US 2022/0037937 A1 Feb. 3, 2022

Related U.S. Application Data

(60) Provisional application No. 63/059,161, filed on Jul. 30, 2020.

(51) Int. Cl.
| | |
|---|---|
| *H02K 1/27* | (2022.01) |
| *B60L 15/20* | (2006.01) |
| *H02K 1/14* | (2006.01) |
| *H02K 1/17* | (2006.01) |
| *H02K 5/04* | (2006.01) |
| *H02K 19/02* | (2006.01) |
| *B60B 27/00* | (2006.01) |

(52) U.S. Cl.
CPC ............ *H02K 1/14* (2013.01); *B60L 15/20* (2013.01); *H02K 1/17* (2013.01); *H02K 5/04* (2013.01); *H02K 19/02* (2013.01); *B60B 27/0015* (2013.01)

(58) Field of Classification Search
CPC .......... H02K 7/1846; H02K 1/14; H02K 1/17; H02K 5/04; H02K 19/02; H02K 1/2789; H02K 11/20; H02K 5/15; H02K 11/25; H02K 2213/03; H02K 5/1732; H02K 11/215; H02K 11/225; H02K 1/2788; B60K 2007/0038; B60K 7/0007; B60K 2007/0092; B60L 2220/44; B60L 15/20; B60L 2220/16; B60B 27/0015; B60B 27/0047; Y02T 10/64; Y02T 10/72
See application file for complete search history.

(56) References Cited

U.S. PATENT DOCUMENTS

2002/0024267 A1* 2/2002 Sakamoto ............ H02K 21/225
310/75 C

* cited by examiner

Primary Examiner — Thomas Truong
(74) Attorney, Agent, or Firm — Dentons Cohen & Grigsby P.C.

(57) ABSTRACT

The presently disclosed invention provides an outer rotor brushless direct current motor that includes a tire integrated as part of the outer rotor, and is thus configured as a direct drive wheel, such as may be used on a mobile robot. The drive wheel includes a cylindrical outer rotor having a plurality of poles positioned on an inner surface, a stationary stator spaced inwardly from the rotor and defining a magnetic clearance gap between the plurality of poles of the rotor and a plurality of electromagnets positioned on an outer circumference of the stator, and a stationary central shaft. The stator is mounted to the central shaft and the rotor is configured for rotation about the stator.

19 Claims, 11 Drawing Sheets

DIRECT DRIVE OUTER ROTOR BRUSHLESS DC MOTOR DRIVE WHEEL

CROSS-REFERENCE TO RELATED APPLICATIONS

This application claims the benefit under 35 U.S.C. § 119(e) of prior U.S. Provisional Patent Application Ser. No. 63/059,161 filed Jul. 30, 2020, the content of which is incorporated herein by reference in its entirety.

TECHNICAL FIELD

This invention relates generally to an outer rotor brushless direct current motor useful in a wheel design, and to use of the motor having an integrated tire on the outer rotor as a direct drive wheel for a mobile robot.

BACKGROUND

With the rapid growth of the e-commerce industry, automation equipment and associated technologies that assist in picking, packing, and storing merchandize are becoming increasing prevalent. Battery powered vehicles such as mobile robots play a large role in much of the automation of these activities. In many mobile robots, a conventional electric motor is used to drive movement. Such motors generally include an outer casing (the stator) that is stationary and a rotating portion inside the stator (the rotor) that rotates to generate mechanical energy. The transmission of the mechanical energy from the electrical motor to remote load locations, such as to the wheels of the robot, introduces losses that reduce the efficiency of the robot and thereby decreases the overall range and/or use time of the robot.

Brushless direct current (BLDC) motors provide a simpler construction that is more cost-effective for maintenance in view of their brushless nature. Typical BLDC motors include a stationary stator outside of the rotor and are thus configured to provide rotation to an axle. Alternatively, an outer rotor rotates about an inner stationary stator, wherein the outer rotor causes rotation of a motor shaft or axle.

Accordingly, there remains a need in the art for a BLDC motor designed to provide direct conversion of electrical power to rotational movement at the load location, such as part of a drive wheel. Further, to extend battery life, there remains a need for lighter weight, lower profile BLDC motors configured for use as drive wheels. Moreover, there remains a need to produce BLDC drive wheels that are more easily installed or removed from a vehicle.

SUMMARY

The presently disclosed invention provides an outer rotor brushless direct current (BLDC) motor that provides direct conversion of electrical power to rotational movement. When a tire is integrated as part of the outer rotor, the BLDC motor may perform as a drive wheel, such as a drive wheel on an electric vehicle or mobile robot.

Accordingly, the present disclosure relates to a brushless direct current motor comprising a stationary stator extending from a stationary central shaft, and a cylindrical outer rotor that rotates about an outer periphery of the stator.

More specifically, the brushless direct current motor comprises a cylindrical outer rotor having a plurality of poles positioned on an inner surface thereof; a stationary stator spaced inwardly of the rotor and having a plurality of electromagnets positioned on an outer circumference thereof; and a stationary central shaft, wherein the stator is mounted to the central shaft and the rotor is configured for rotation about the stator. A distance between the plurality of poles of the rotor and the plurality of electromagnets of the stator defines a magnetic clearance gap.

According to certain aspects, the poles are constructed of permanent magnets alternatively magnetized north and south.

According to certain aspects, the central shaft includes a central axial bore and at least one radial wire passthrough bore in communication with the central axial bore. The passthrough bore provides passage of wires from the electromagnets to the central bore, which then provides passage of these wires to a motor controller. According to certain aspects, the central shaft may include two or more radial wire passthrough bores.

According to certain aspects, the rotor further includes a sidewall extending inward toward the central shaft, and a cover positioned opposite the sidewall of the rotor and attached to an outer circumferential edge of the rotor such that the stator is positioned between the cover and the sidewall of the rotor. Rotation of the rotor and the cover about the central shaft is permitted by a plurality of bearings positioned therebetween. The plurality of bearings may comprise bearings positioned on the central shaft at opposite sides of the stator. For example, a first set of the bearings may be positioned between and in contact with the cover and the central shaft, and a second set of the bearings may be positioned between and in contact with the sidewall of the rotor and the central shaft.

According to certain aspects, the rotor includes a sidewall extending inward toward the central shaft, wherein rotation of the rotor about the central shaft is permitted by a first set of bearings positioned therebetween. The motor may further comprise a cover positioned opposite the sidewall of the rotor and attached to an outer circumferential edge of the rotor such that the stator is positioned between the cover and the sidewall of the rotor. Rotation of the cover about the central shaft is permitted by a second set of bearings positioned therebetween.

According to certain aspects, the central shaft may further include at least two axial bores offset from the central axial bore and each configured to accept an attachment element. The central shaft may include three, four, five, six, or more axial bores evenly spaced and radially offset from the central axial bore, wherein each axial bore is configured to accept an attachment element. Moreover, the cover may include holes alignable with the axial bores of the central shaft to provide passage of the attachment element fully therethrough. In this way, rotation of the cover may be unimpeded by the attachment element positioned within the central shaft. The attachment element are configured to provide attachment of the motor to a vehicle or mobile robot.

According to certain aspects, the motor includes an encoder such as an incremental encoder. For example, the cover may comprise an encoder magnet centrally located thereon, and the central shaft may comprise an encoder read head positioned adjacent the encoder magnet. Wires from the electromagnets and the encoder may pass through the central bore and exit a side of the central bore opposite the cover.

The present disclosure also relates to a drive wheel for a vehicle, wherein the drive wheel comprises a brushless direct current motor as described hereinabove, and further comprises a tire attached to an outer surface of the rotor opposite the plurality of poles. The drive wheel may be included on an autonomous robot. Thus, the present disclosure also relates to an autonomous robot comprising two drive wheels as described hereinabove, wherein a battery of the robot supplies power to the plurality of electromagnets, and a motor controller of the robot controls a speed, torque, and rotational direction of the drive wheels. According to certain aspects, the motor controller is configured to control a speed and/or torque of each of the drive wheels separately.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized, and other changes may be made without departing from the spirit or scope of the subject matter presented herein.

DETAILED DESCRIPTION

The present disclosure describes a novel design for an outer rotor brushless direct current (BLDC) motor and use of the motor with an integrated tire on the outer rotor as a drive wheel. The drive wheel is attachable by an outer front face thereof to a vehicle, thus simplifying attachment and/or replacement of the drive wheel on the vehicle. Accordingly, the drive wheel may find use on a wide range of vehicles, such as autonomous vehicles. The above summary and drawings are not intended to describe or show each illustrated embodiment or every possible implementation of the presently disclosed invention.

Definitions and Abbreviations

"Substantially," as used herein, is understood to mean to a great or significant extent, such as at least 80%, or 90%, or 95%, 96%, 97%, 98%, or even 99%. For example, when an object is described as having a property substantially the same as a comparative such as a diameter or shape or position (e.g., perpendicular or parallel), etc., the property will be within at least 80% of the value of the comparative.

The terms "goods," "products," "items," and SKUs may be used interchangeably, and may be taken to indicate items that need to be retrieved and/or stored. Such items can include any consumer product, including but not limited to, packaged and unpackaged products (e.g., packaged food and individual units of food such as produce). Such items can also include items that are not considered consumer products (e.g., library items). Furthermore, while each of these terms is generally understood to indicate a single unit, these terms may refer to groups of these units packaged together, such as in a multipack or in a case.

The terms "tote" and "bin" are also used interchangeably, and may be taken to mean a container used to store products or goods while they are located on a shelf within a logistics facility, or as they are moved throughout the logistics facility on or by a robotic system or conveyor belt. Exemplary containers include at least plastic, metal, wood, or cardboard bins or boxes, and plastic, metal, wood, or cardboard trays. Any of these containers may be specialized or may be standard examples of such a container, e.g., a standard commercially available plastic bin or cardboard box. Additionally, individual items or boxes may be packaged together and may form a tote or bin as used herein, such as by shrink wrapping, or in a case or multipack.

The process of selecting and retrieving items, bins, or cases from a specific storage location in a facility is referred to as "picking", wherein selection of individual products or items may be referred to as piece-picking or each-picking. The process of breaking cases for individual product picking, i.e., taking the individual items from the case or pallet and placing them in a specific storage location in a facility, is called "put-away". Put-away may also comprise placing bins or cases or even items in a specific location within a facility or placing multipacks in a specific location within a facility. Picking and put-away occurs in both distribution warehouses and retail centers.

The terms "storage" and "data storage" and "memory," when used in the context of a computer system or method, may be used interchangeably and may be taken to indicate both transient and permanent storage (i.e., on a non-volatile memory hardware device) of data on a computer.

The term "logistics" facility may be taken to mean any facility that provides for the efficient production, storage, and/or flow of goods. Exemplary logistics facilities include at least warehouses, distribution centers, retail centers, and manufacturing facilities.

The term "warehouse management system" or WMS may be understood to mean any database which stores information about items or products stored within a logistics facility, and may include the product size, weight, inventory count, storage location, etc. The terms "warehouse execution system," or WES and "warehouse control system," or WCS may be understood to mean a software application that directs the real-time activities within logistics facility. The terms warehouse management system, WMS, warehouse execution system, WES, warehouse control system, and WCS are used interchangeably herein, and reference to one may comprise reference to any or all of these terms. Moreover, the term "remote server" may be used to refer to at least a processor/memory of a computing system remote from the robotic system being discussed, such as the central server or a processor/memory of the WMS, WES, and/or WCS.

Various aspects of the motor, drive wheels, and autonomous vehicles comprising the drive wheels may be illustrated by describing components that are coupled, attached, and/or joined together. The terms "coupled", "attached", and/or "joined" are interchangeably used in this disclosure to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" are used herein to describe one element's relationship to another element illustrated in the drawings. It will be understood that relative terms are intended to encompass different orientations of aspects of the system in addition to the orientation depicted in the drawings. By way of example, if aspects of the drive wheels shown in the drawings are turned over, elements described as being on the "top" side of the other elements would then be oriented on the "bottom" side of the other elements as shown in the relevant drawing. The term "top" can therefore encompass both an orientation of "top" and "bottom" depending on the particular orientation of the drawing.

Embodiments of the Present Disclosure

The presently disclosed invention relates to a novel design for an outer rotor BLDC motor, and use of the motor with an integrated tire as a drive wheel. The presently disclosed invention also relates to use of these drive wheels on autonomous vehicles, such as an autonomous mobile robots (AMRs) and/or autonomous mobile manipulation robots (AMMRs).

As used herein, the term "vehicle" may be taken to include any machine intended to move people or goods, such as a car, cart, or robot. According to preferred aspects, the vehicle is an electric vehicle, such as a robot having a mobile base. As used herein, the term robot may include any machine that may be programmed by a computer to perform complex actions. An autonomous mobile robot (AMR) is one that is capable of navigating an uncontrolled environment without physical or electro-mechanical guidance. An autonomous mobile manipulation robot (AMMR) is a specialized AMR that includes a robotic arm for picking or transfer of materials.

As used herein, reference to any one of a mobile base, an AMR, or an AMMR may be understood to encompass any one or more of these unless specifically indicated otherwise.

Referring now to the drawings, FIGS. 1-6C illustrate a novel design for the outer rotor BLDC motor configured as a drive wheel 10 according to various aspects of the present disclosure. With specific reference to FIGS. 1 and 2, the drive wheel 10 includes an integrated tire 12 and a front cover 14 having holes 16 that allow passage of front attachment element. The tire may be formed of any material known in the art. Exemplary tire materials include non-marking polymers, such as polyurethane, silicone, rubber, and the like.

According to certain aspects, an exemplary attachment element would pass through holes 16 in the front cover and extend through a thickness of the drive wheel 10 to attach to a vehicle. For example, attachment element may include bolts, and the holes 16 in the front cover would be configured to accept bolts that traverse a width of the drive wheel and extend from a back side of the drive wheel (see openings 17 in FIG. 4; openings 17 and bolts 19 of FIG. 6B). These bolts, or other attachment element (cotter pins, pegs, etc.), would then engage corresponding attachment holes and means, e.g., bolt holes and nut, respectively, on a vehicle to which the drive wheels 10 are attachable.

Figure 3:
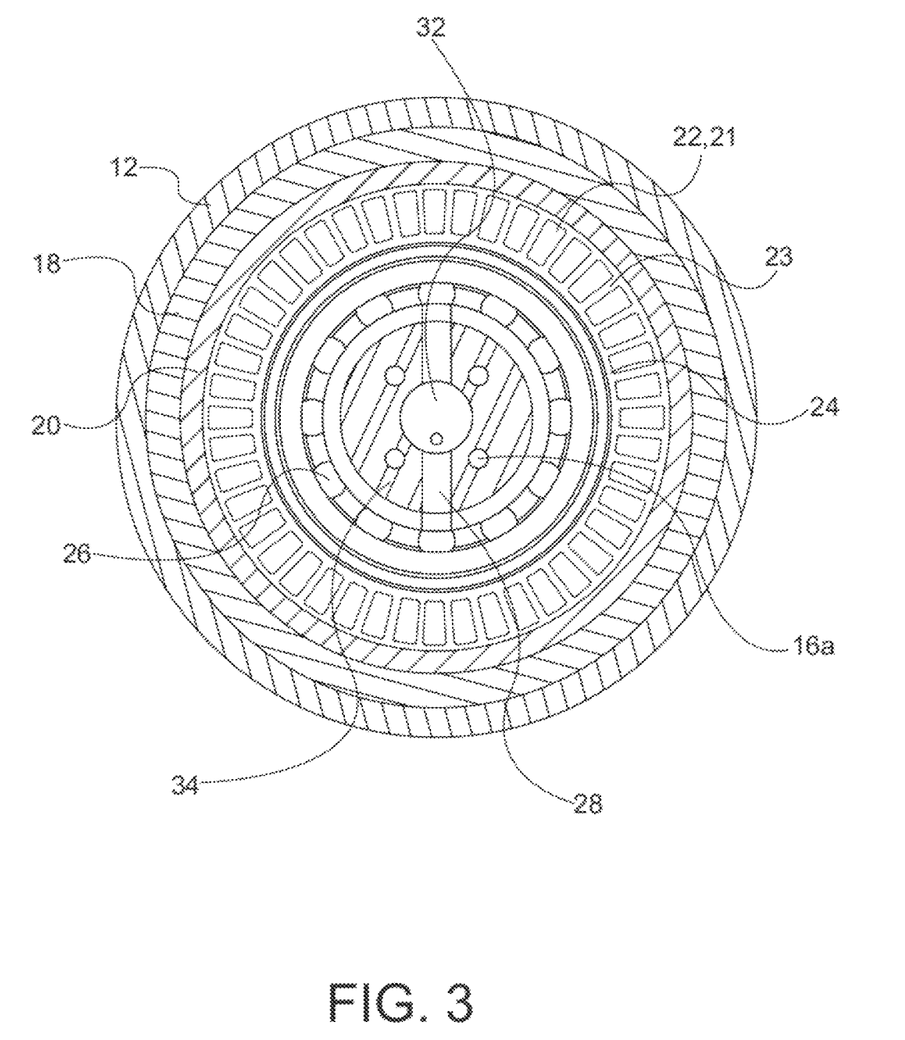
FIG. 3 illustrates a cross-sectional view taken along line C-C of the drive wheel shown in FIG. 4.
Figure 4:
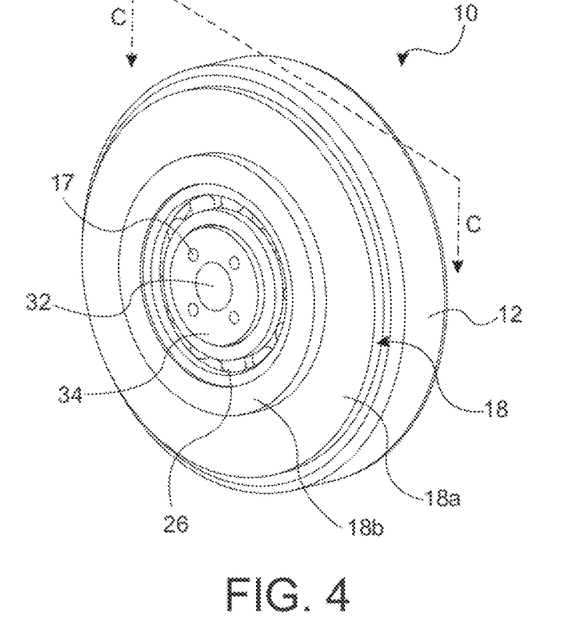
FIG. 4 illustrates a rear perspective view of the drive wheel shown in FIG. 1.

Shown in FIG. 3 is a cross-sectional view of the drive wheel 10 taken along line C-C of FIG. 4. Note that this cross-sectional view is not through a center of the drive wheel thickness, and thus does not show a cross section of all internal components (e.g., bearings 26). The drive wheel 10 generally includes components of a BLDC motor, such as a stator 24 comprising electromagnets 21, a rotor 18, and alternating poles, e.g., permanent magnets 20. The rotor 18 is positioned around the circumference of the stator 24 such that it is capable of rotation around the stator. Attached or connected to an inner wall of the rotor 18 are a number of alternating poles, e.g., permanent magnets 20 with alternating north and south poles. These magnets 20 are generally positioned with a small clearance or magnetic clearance gap between an inward facing surface of the magnet (i.e., inward toward a center of the BLDC motor) and the outer most surface of the stator (i.e., outward away from a center of the BLDC motor). The magnetic clearance gap may be substantially uniform. The magnetic clearance gap may be 5 mm or less, such as 4 mm or less, or 3 mm or less. In general, the smaller the magnetic clearance gap the greater the force provided by each electrical pulse to the stator 24 (i.e., to the electromagnets 21).

The alternating poles may be magnets, such as permanent magnets 20 formed of a ferromagnetic material, including iron, cobalt, or nickel. Alternatively, or additionally, the permanent magnets 20 could be rare-earth magnets such as samarium-cobalt or neodymium-iron-boron. Other appropriate materials are known and within the scope of the present disclosure.

The stator 24 is stationary and is formed around the outer circumference of a circular mechanical support element, or central shaft 34. A plurality of electromagnets 21 are positioned within slots 22 along an outer circumference of the stator 24 proximate the permanent magnets 20 on the inner wall of the rotor 18.

Also shown in FIG. 3 are the attachment openings, i.e., axial bores 16a, that pass through the width of the drive wheel 10 and are positioned in the central shaft 34. These accept the attachment element discussed above that provide connection between the drive wheel and the vehicle to which it may be attached. The central shaft 34 also includes a central axial bore 32 that extends longitudinally through the central shaft (i.e., thickness of the drive wheel 10), and at least one wire passthrough bore 28 that extends radially from the central axial bore 32 through the central shaft 34. The central axial bore 32 and wire passthrough bore 28 provide for passage of wiring from the electromagnets and an encoder, such as to a motor controller and power supply, generally a battery provided by the vehicle to which the drive wheel is attached. As shown in FIGS. 3 and 6C, the drive wheel 10 may include two or more wire passthrough bores 28.

Shown in FIG. 4 is a rear perspective view of the drive wheel 10. The tire 12 that is positioned on an outermost radial circumference of the rotor 18 is illustrated, as well as a rear position 17 of the holes configured to accept the attachment element on the central shaft 34. Also indicated is the sidewall (18a, 18b) of the rotor 18. While this sidewall (18a, 18b) is shown to be an integral portion of the rotor 18, it could also be configured as a separate and even separable back cover, much as the front cover 14. This may help to reduce a weight of the drive wheel 10, as the stator 24 is typically formed of a ferrous material. Configuring the sidewall as a separate component, such as a back cover, allows lighter weight materials to be incorporated in the drive wheel 10. For example, a back cover could be formed of a lightweight material such as aluminum or plastic. When configured as a separate back cover, attachment elements may be included on each of the rotor and the back cover, such as along circumferential edges of each.

Figure 2:
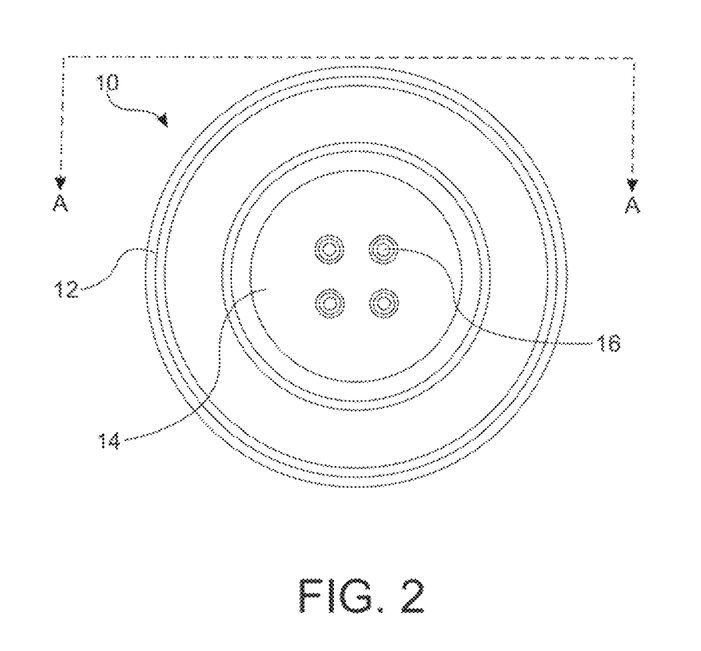
FIG. 2 illustrates a front view of the drive wheel shown in FIG. 1.
Figure 5:
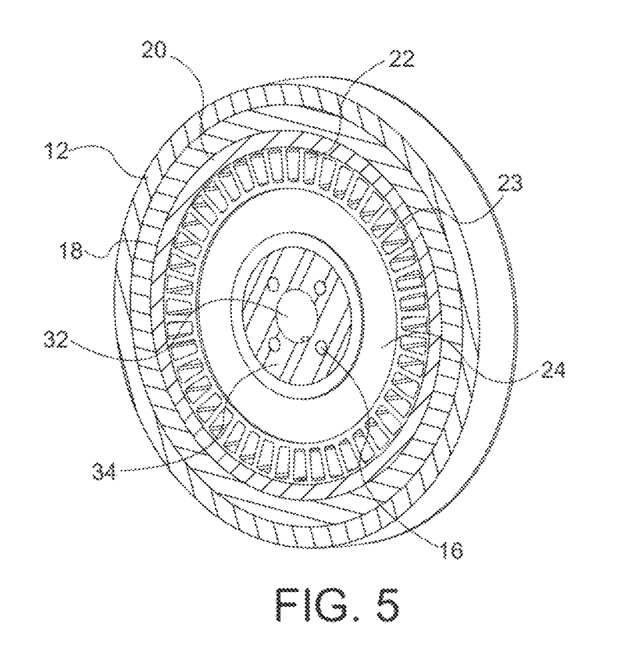
FIG. 5 illustrates a cross-sectional view taken along line A-A of the drive wheel shown in FIG. 2.

FIG. 5 shows a cross-sectional view taken along line A-A of the drive wheel 10 shown in FIG. 2. Note that this cross-sectional view is not through a center of the drive wheel thickness, and thus does not show certain of the internal components (e.g., bearings 26). Evident in the cross-sectional view is the stator 24, and the slots 22 having sidewalls 23 that are positioned radially along an outer circumference of the stator 24. While the stator 24 is shown to include 44 slots 22 configured to hold electromagnets 21, any number of slots and electromagnets could be included in the BLDC motor and drive wheel 10 of the presently disclosed invention. For example, the BLDC motor and drive wheel 10 could include from 2 to 200 slots and/or electromagnets depending on the particular application, including the desired speed and torque for the application.

Moreover, the central shaft 34 is shown to be formed in the shape of a ring, as shown in FIGS. 4 and 5. Alternately, any shape could be used, including, for example, a hub-and-spoke shape in which the stator 24 is supported by spokes connecting to a central hub. The central shaft may be formed of any rigid material that would provide sufficient rigidity to support the weight of a vehicle. For example, a composite, a solid metal, or a metal alloy material could be used. Alternatively, a rigid plastic material could be used, or a heterogeneous mix of any two or more of such materials.

Figure 1:
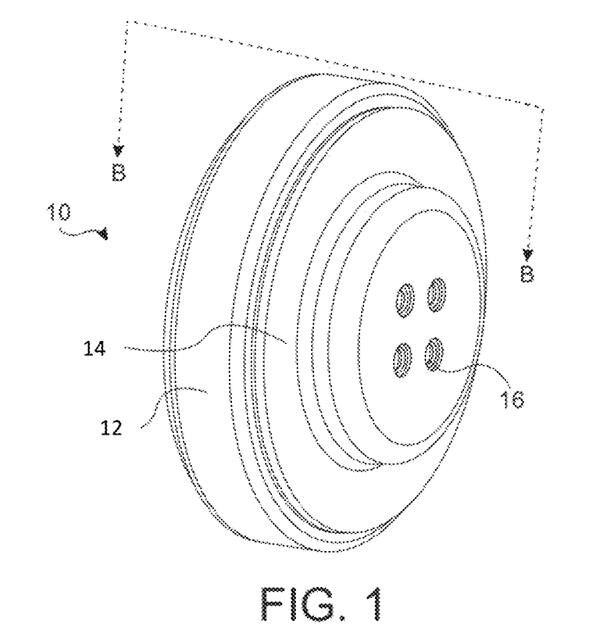
FIG. 1 illustrates a front perspective view of an outer rotor brushless DC motor drive wheel in accordance with certain aspects of the present disclosure.
Figures 6A, 6B:
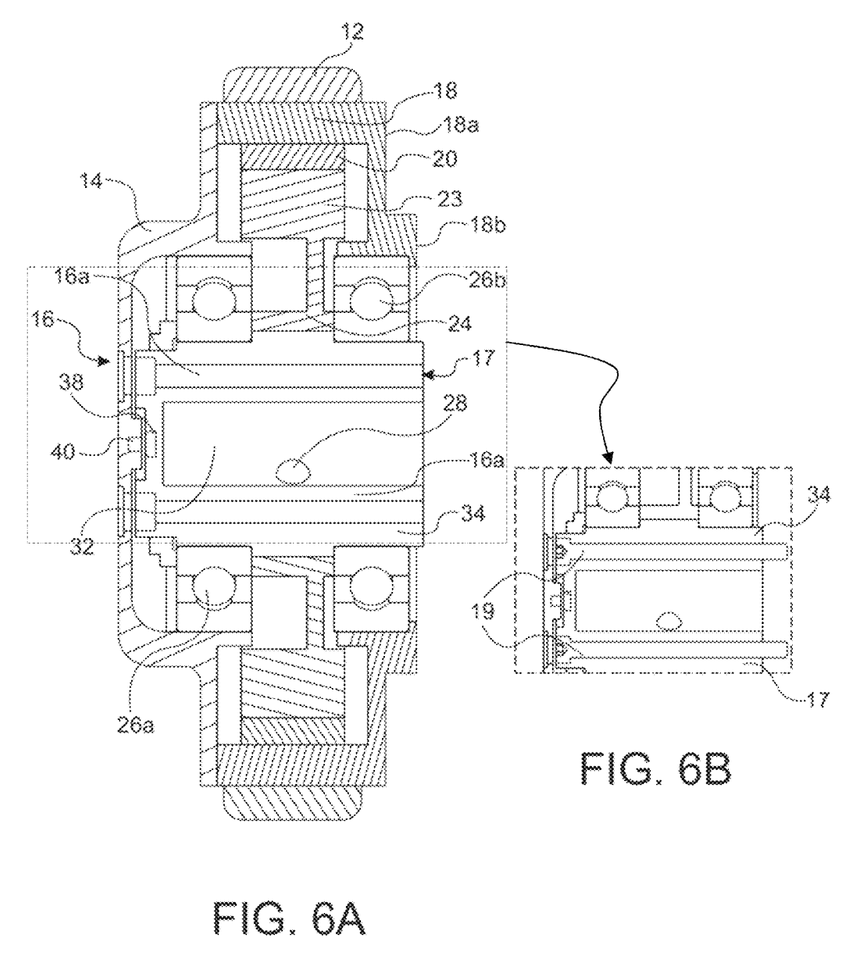
FIG. 6A illustrates a side cross-sectional view taken along line B-B of the drive wheel shown in FIG. 1.
FIG. 6B illustrates a portion of the cross-sectional view shown in FIG. 6A showing placement of attachment element through the central shaft in accordance with certain aspects of the present disclosure.
Figure 6C:
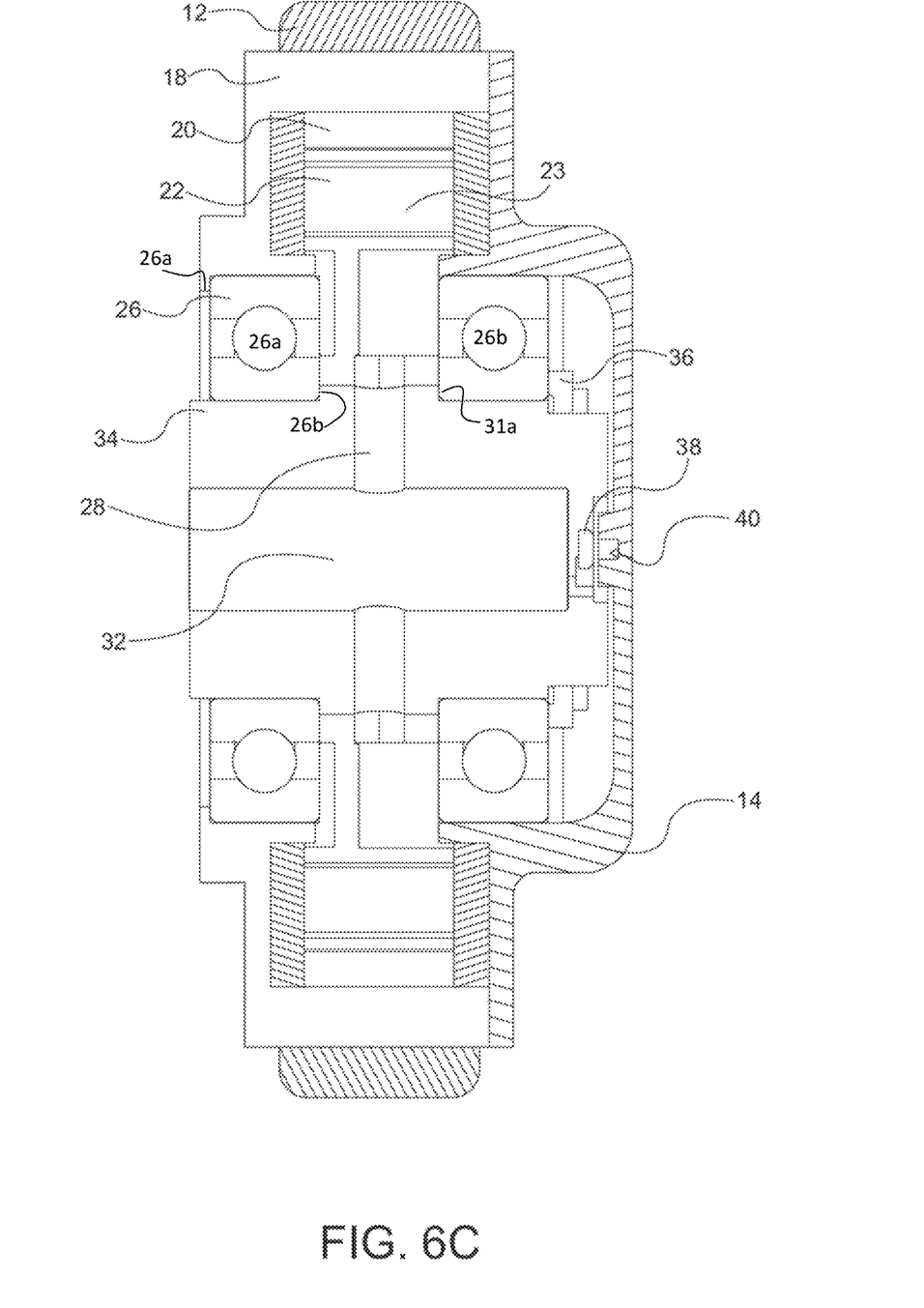
FIG. 6C illustrates another side cross-sectional view taken along line B-B of the drive wheel shown in FIG. 1, rotated by 45° with respect to the view shown in FIG. 6A.

With specific reference to FIGS. 6A and 6C, which are cross-sectional views taken along line B-B of FIG. 1, the stator 24 is shown to extend radially inward and connect to the central shaft 34. In FIG. 6A, a sidewall 23 of the slot 22 is shown, as is an inner most portion of the stator 24 attached to the central shaft 34. In FIG. 6C, which shows a view rotated 45° about an axis parallel with the longitudinal axis of the central axial bore 32, the slot 22 is evident (looking into a slot with a sidewall 23 at the back).

These views of the drive wheel 10 clearly illustrate the cover 14 on an outward facing surface, i.e., when the drive wheel is attached to a vehicle, and a sidewall (see FIG. 6C, 18a, 18b) of the rotor 18 that covers a large portion of an inward facing surface (see also FIG. 4). Also evident in FIG. 6A are the holes 16 in the cover that allow passage of the attachment element, which extend through axial bores 16a in the central shaft 34. Reference number 17 points to an exit point of the axial bores 16a on a back side of the central shaft 34.

As shown more clearly in FIG. 6B, the attachment element 19, such as a bolt, may pass through the holes 16 in the cover and may reside in the axial bores 16a extending past the exit 17 on the back side of the central shaft 34 so that they may engage complementary bores on a vehicle to which the drive wheel is attachable. Once engaged, the attachment element does not interfere with rotation of the cover, i.e., as the rotor 18 and cover rotate about the stator 24, as they may be countersunk into the central shaft so that they are flush with a surface of the central shaft 34.

As indicated above, the stator 24, electromagnets 21 positioned in the slots 22, and central shaft 34 do not rotate, while the rotor 18 and magnets 20 are configured for rotation. To support the axial rotation of the rotor 18 relative to the stator 24, bearings are included between the cover 14 and the central shaft 34, and between the sidewall (18a, 18b) of the rotor 18 and the central shaft 34 (26b and 26a, respectively).

The first set of bearings 26a may be held in place by a lip 29a on the sidewall 18b of the rotor 18, and an opposite lip 29b on the central shaft 34. The second set of bearings 26b may be held in place by a lip on the central shaft 34, generally opposite the lip 29b, and a bearing nut 36, such as a locking nut.

The electromagnets 21 of the stator 24 can be energized in a controlled fashion to drive rotation of the magnets 20 attached to the inner surface of the rotor 18, and thus drive rotation of the tire 12 attached to the rotor 18. Accordingly, also included on each drive wheel 10 is an encoder. The encoder may be an absolute encoder or an incremental encoder. Moreover, the encoder may use the Hall effect or the magnetoresistive effect.

An exemplary implementation of an encoder may include a magnetic incremental encoder, such as an encoder comprising a read head 38 and an encoder magnet 40 as shown in FIGS. 6A and 6C. The encoder magnet 40 is shown to be attached to an inner side of the cover 14, which rotates with the rotor 18, while the encoder read head 38 is attached to the stationary central shaft 34 (i.e., a rotary encoder). As the rotor 18/cover 14 rotate, the encoder magnet 40 will also rotate and present different poles to the encoder read head 38. As such, the encoder senses a position of the rotor 18, and this information may be passed to a motor controller so that the frequency and pulse width of the switching pattern, such as the groupings of electromagnets activated, may be adjusted based on information from the encoder (feedback).

While described as including a specific technology, other encoder technologies, such as optical, inductive, capacitive, or laser encoders are within the scope of the presently disclosed invention. For example, the motor and drive wheel 10 may include a magnetic incremental encoder, such as described hereinabove and shown in FIGS. 6A and 6B, and may further include one or more hall sensors. A hall sensor detects a magnetic field generated from the permanent magnets 20 of the rotor 18 to determine a position of the rotating rotor and may be fixedly installed, such as on the stator 24. For example, three hall sensors may be disposed to be able to detect three hall signals which are formed by the magnetic field generated from the rotor and have a phase difference of 120°. In this way, the drive wheel 10 can sufficiently transmit the magnetic flux generated from the permanent magnets 20 of the rotor 18 to the hall sensors to enable the hall sensors to accurately detect the change in the magnetic field, thereby accurately detecting the rotor position and speed. This information may be transmitted via a wired connection to the motor controller (100 of FIG. 11).

The electromagnets 21 generally include a coil comprising windings. According to certain aspects, the windings may be copper or aluminum, or another conducting material. A direct current may be supplied to non-adjacent windings to energize different groupings of windings (i.e., at least two groupings). The groups of windings energized may be alternated electronically based on a position of the rotor 18 and a desired speed of the rotor, as detected by the encoder(s).

When attached to a vehicle, such as an autonomous robot, the drive wheel 10 or robot may include a motor controller, wherein the motor controller may control provision of power to individual groups of windings, i.e., electromagnets 21. That is, the motor controller may be configured to apply a switching pattern of power to the different groups of windings to cause the outer rotor to rotate about the stator. The switching pattern comprises substantially simultaneously energizing by power from a battery at least two opposite electromagnets of the plurality of electromagnets on the stator 24, wherein the at least two opposite electromagnets are positioned on substantially opposite sides of an axis about which the rotor is configured to rotate. In this way, the motor controller may control a speed of the outer rotor 18 by varying a frequency of the switching pattern, and/or may control a torque of the outer rotor by varying a pulse width of the switching pattern (e.g., certain adjacent pairs of windings may be linked to form a wider electromagnet 21).

According to certain aspects, a number of permanent magnets 20 on the inner surface of the rotor 18 may not match the number of windings (i.e., electromagnets 21). In such a case, advance of electromagnetic impulses around the axis of the motor (i.e., drive wheel 10) would proceed faster or slower than the rotor 18 turns. That is, with a greater number of magnet poles (i.e., more permanent magnets 20) than stator poles (i.e., electromagnets 21), a maximum torque is increased while a speed of the rotor advance is decreased in proportion to the ratio of magnet poles to stator poles. Moreover, the permanent magnets 20 and electromagnets 21 need not be aligned. For example, the number of permanent magnets 20 could be unequal to the number of electromagnets 21, and they could be spaced in such a way that at least some of the permanent magnets 20 are always un-aligned with some of the electromagnets 21, in order to avoid potential starting problems.

According to certain aspects, the drive wheel 10 may further include a temperature sensor, such as a thermistor, for temperature readings and control. Higher power can increase operating temperatures. As such, the motor controller may receive temperature readings, either by a wired or wireless communication, and may change a speed or voltage input to the drive wheel 10 accordingly. The thermistor readings may be transmitted via a wired signals to the motor controller (200 of FIG. 11), wired or wireless signals to the mobile base (100 of FIG. 11), and may also be transmitted via wireless signals to a central server (400 of FIG. 11) such as a warehouse management system or the like, or to the cloud.

Figure 7A:
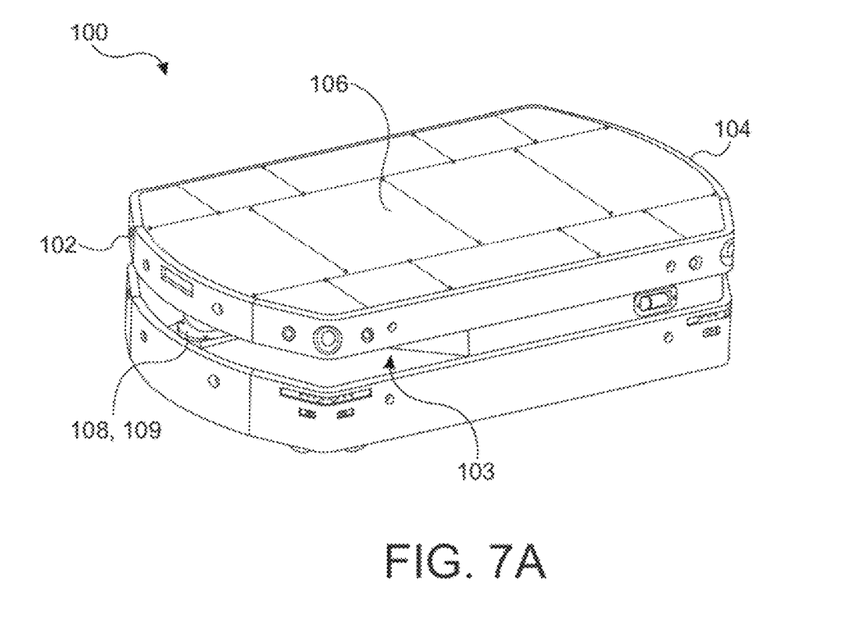
FIG. 7A illustrates a front perspective view of an autonomous mobile robot comprising drive wheels in accordance with certain aspects of the present disclosure.
Figure 7B:
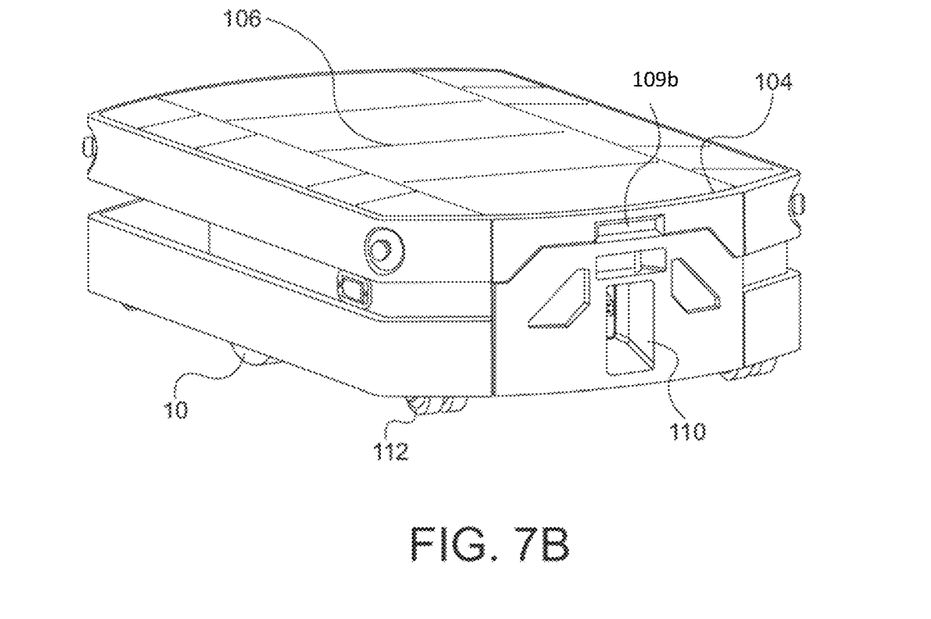
FIG. 7B illustrates a rear perspective view of the autonomous mobile robot shown in FIG. 7A.
Figure 7C:
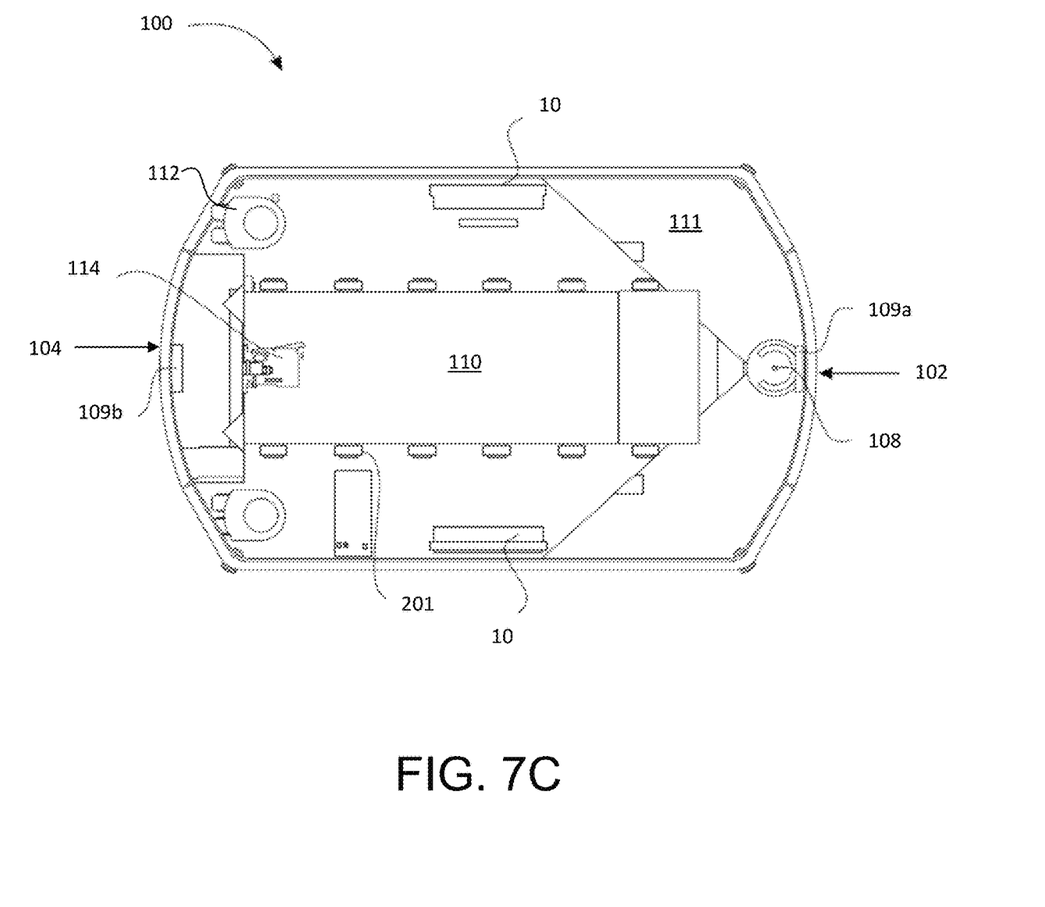
FIG. 7C illustrates a top view of internal components of the autonomous mobile robot shown in FIGS. 7A and 7B.

FIGS. 7A-7C illustrate an autonomous mobile robot (AMR) on which the drive wheels of the present invention may be used. Shown in FIGS. 7A and 7B are front and rear perspective views of the AMR, or mobile base 100, according to certain aspects of the presently disclosed invention. The mobile base 100 may include two drive wheels 10 positioned at either side of the mobile base, and stabilizing wheels 112. For example, the mobile base may include stabilizing wheels positioned at each corner of the base that may assist in weight distribution and stability. The presently disclosed drive wheels 10 offer the mobile base 100 forward and reverse navigation (i.e., individual control over the direction of rotation and speed of each drive wheel).

Also shown in FIG. 7A are positions of sensors on the mobile base 100 that are configured to provide up to a 360-degree field of view and permit autonomous movement and navigation. Exemplary sensors include any of cameras, depth cameras, laser and/or LiDAR devices, radar, sonar, infrared, touch sensors such as whiskers or bump sensors, GPS, and proximity sensors. Exemplary cameras may include any of 3D or structured light depth cameras, stereo cameras, color cameras, grey scale cameras, and combinations thereof. According to certain aspects, a front end 102 of the mobile base 100 may include a laser ranging device 108, such as LIDAR, augmented with 3D cameras 109, and on a back end 104 of the mobile base 100 may include additional cameras 109b, such as an additional 3D camera.

According to certain aspects, a unique configuration of a concave region 103 at the front end 102 of the mobile base 100 affords a wide field of view for the sensors at the front end 102. For example, the mobile base 100 is designed to afford up to a 180-degree field of view for the laser ranging device, such as up to a 240-degree or even 270-degree field of view (region 111 outlined in front of the robot 100). The field of view of the laser ranging device may be greater than 240-degrees and up to 270-degrees. Alternatively, certain sensors may be positioned on a top portion of the mobile base 100 or on an underside of a shelf on the mobile base, such as under the transport platform 120 attached to the mobile base 100 shown in FIG. 8A.

As shown, an exemplary AMR (autonomous mobile robot, also referred to herein as a mobile base 100) may include two drive wheels 10. The mobile base 100 may include an onboard computer processor and memory, as well as a communication interface that may allow wired and/or wireless communication, such as with external servers and the cloud (see FIG. 11). Accordingly, the encoder and/or hall sensors (collectively 300a of FIG. 11) on each drive wheel 10 may provide motion feedback to the processor of the mobile base 100 via communications from the motor controller 200, which can be used to precisely control the speed of each wheel independently as discussed hereinabove to achieve the desired rotation and translation velocities of the mobile base 100. In combination with information from the various sensors on the robot (300c), discussed below, the mobile base 100 may autonomously navigate in a logistics facility along a collision-free path.

A processor and memory of the mobile base 100 may be independent of, but in communication with, a motor controller of the drive wheel(s) 10. For example, the motor controller may include a processor and memory, and may communicate with a processor of the mobile base 100 via a wired or wireless communication. The motor controller may further receive signals from the various position sensors on the drive wheel (e.g., encoders, Hall sensors, 300A of FIG. 11) directly via wired communication. The motor controller 200 and/or the mobile base 100 (i.e. processor of the mobile base via a communication interface) may receive signals from the temperature sensors on the drive wheel 10 via wired or wireless communication. Moreover, the temperature sensors of the drive wheels 10, and the sensors of the mobile base 100 may exchange signals with external servers via wired or wireless communication.

Figure 8A:
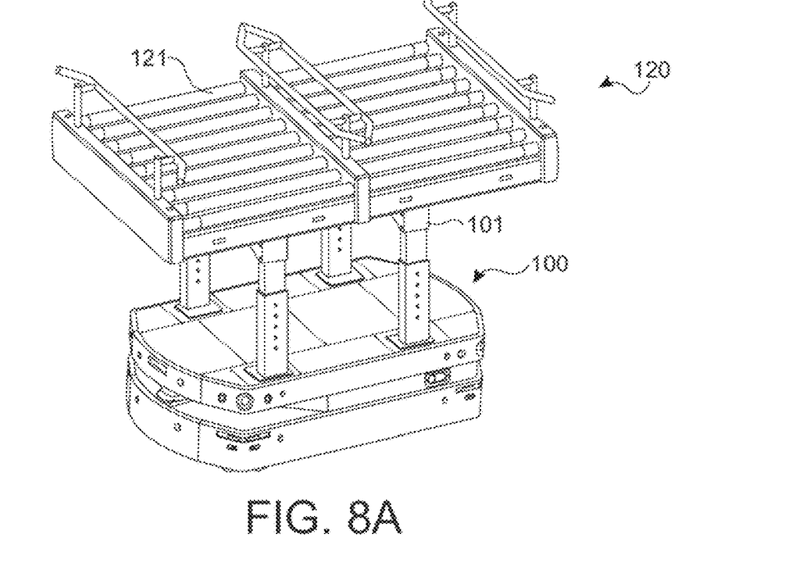
FIG. 8A illustrates a front perspective view of one configuration of the autonomous mobile robot shown in FIG. 7A in accordance with certain aspects of the present disclosure.
Figure 8B:
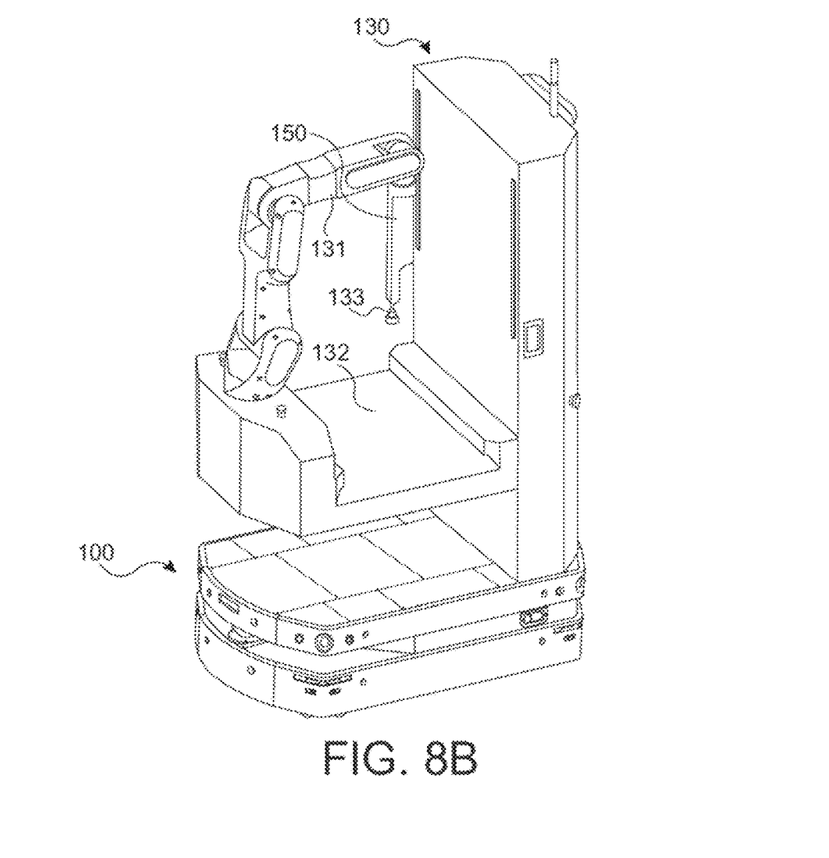
FIG. 8B illustrates a front perspective view of another configuration of the autonomous mobile robot shown in FIG. 7A in accordance with certain aspects of the present disclosure.
Figure 11:
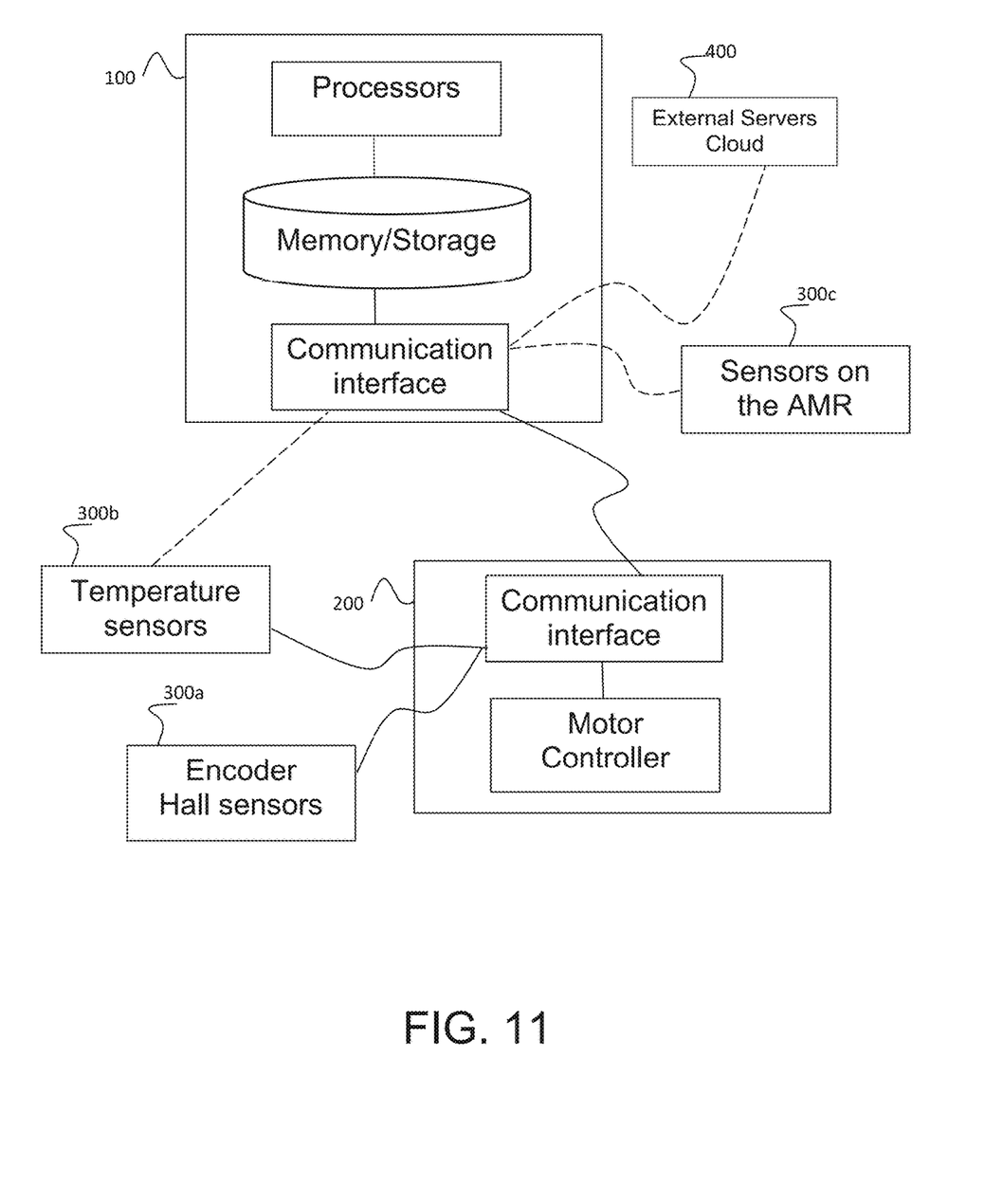
FIG. 11 illustrates a block diagram of a mobile robotic system comprising drive wheels in accordance with certain aspects of the present disclosure.

The mobile base 100 generally includes one or more onboard processors, an onboard storage or memory, and a remote communication interface that allows communication with external servers, the internet, and other similar or dissimilar robots (e.g., see FIGS. 8A, 8B, and 11). This communication may be established through a wireless network via a wireless access point. The mobile base 100 may move and navigate between locations in a work zone. During navigation, data from the various sensors (e.g., any of 108, 109, 109a, etc., cumulatively 300 of FIG. 11) may be processed by the onboard computer processor in a navigation software module to extract two modalities of information. The first modality may be local mapping information that indicates which areas around the mobile base 100 are traversable and which areas contain obstacles. The second modality may be visual or audible landmark locations, such as the visual landmark marker locations. Characteristics of the landmarks may be stored on a central server (200 of FIG. 11) or on the memory of the mobile base 100 (i.e., storage). When the characteristics of the landmarks are stored on the memory, the mobile base 100 may navigate autonomously through a logistics facility and may not require constant communication from the central server.

The mobile base 100 may further include a top surface 106 configured to support items, cases, or totes, and further configured to be customizable, such as by an end user, for a specific task or set of tasks. For example, as shown in FIG. 8A, the top surface 106 of the mobile base 100 includes attachment arms 101 (four are shown) that may secure a transport platform 120 above the mobile base 100. The custom transport platform 120 may include a conveyance system, such as the roller bars 121 shown, or any detailed hereinabove (e.g., conveyor belt). Moreover, the transport platform 120 may include front and back rims that may ensure proper placement of an item, bin, or tote on the conveyance system.

With reference back to FIGS. 7B and 7C, a field replaceable battery 110 is shown engaged within a battery slot of the mobile base 100, such as via an angled wheel/rail system (201) and locked into position with a mechanical or electronic latch (114). All systems onboard the mobile base 100, including the electromagnets of the drive wheels 10 and/or other sensors thereon, may be powered from onboard batteries such as the field replaceable battery 110. The battery 110 may also provide power to a motor controller of the drive wheels 10 when that is provided as a component separate from the processor and memory of the mobile base 100.

The battery 110 may supply power to the mobile base 100, and thus the drive wheels 10, during navigation for a limited time and may be rechargeable to maintain operation through an economically viable work period. Battery charging may occur opportunistically during times at which no work orders are present for the mobile base 100, or charging may occur separately from the mobile base 100. In this later case, the field replaceable battery 110 may be swapped with separately charged batteries for continued operation of the mobile base 100.

For opportunistic charging, the mobile base 100 may have a charging station in a designated area of the facility in which the mobile base 100 can make temporary electrical contacts which feed power into the onboard batteries (i.e., field replaceable battery 110) while the mobile base 100 is present. For separate charging, a battery hot-swap may be performed by using permanently installed smaller short-life (i.e., minutes) onboard batteries to maintain power while the larger field replaceable battery 110 is replaced with a fully charged field replaceable battery 110. This prevents the mobile base 100 from needing to power down during battery swap, which saves time.

Hot-swapping may be done manually by a human operator or may be done automatically such as with internal mechanisms of the mobile base 100 and charging station that may automatically discharge/swap batteries at the charging station with the mobile base 100 coordinating the procedure. That is, the mobile base 100 may automatically discharge an exhausted field replaceable battery at an empty charging station, travel to a second charging station having a charged field replaceable battery thereon and load the charged field replaceable battery from that second charging station. The smaller, short-life batteries may provide sufficient power for each of these operations, i.e., maintain power to the motor controller and each of the drive wheels. Moreover, the smaller, short-life batteries may be recharged by the field replaceable battery during normal operation of the transport robot.

Exemplary battery configurations are shown in U.S. Patent Publication Nos. 2018/0104829 and 2020/0316786, the entire contents of which are incorporated by reference herein. Exemplary designs for an AMR, or mobile base, are shown in U.S. patent application Ser. No. 17/350,911 and US Patent Publication No. 2020/0316786, the entire contents of which are incorporated by reference herein.

A major advantage of the presently disclosed drive wheels 10 is that they occupy a smaller profile within the mobile base 10, as is shown in FIG. 7C. This provides the space necessary to include larger, longer life batteries within the mobile base and thus a much longer driving range, battery life for the mobile base 10.

Another exemplary configuration of the mobile base 100 is shown in FIG. 8B, which includes a vertical housing 130 that supports and provides vertical movement of a platform 132 comprising a manipulation arm 131, i.e., an autonomous mobile manipulation robot (AMMR). The platform 132 may hold items, bins, or totes picked by the manipulation arm 131 having an end effector 133. The onboard computer processor may be configured to run a set of programs with algorithms capable of performing picking by the arm 131 and end effector 133. Further, the onboard computer processor may utilize data from sensors and encoders (108, 109, 109a, 150, etc.) to output control signals to the mobile base 100, and thus the drive wheels 10 and manipulation arm 131 for navigation and picking, respectively.

Exemplary designs for an AMMR are shown in U.S. Pat. Nos. 9,519,882; 9,785,911; 9,940,604; 10,147,069; and 10,867,279 the entire contents of which are incorporated by reference herein. Exemplary designs for manipulation arms of the AMMRs are shown in U.S. patent application Ser. No. 17/196,831, the entire content of which is incorporated by reference herein.

Figure 9:
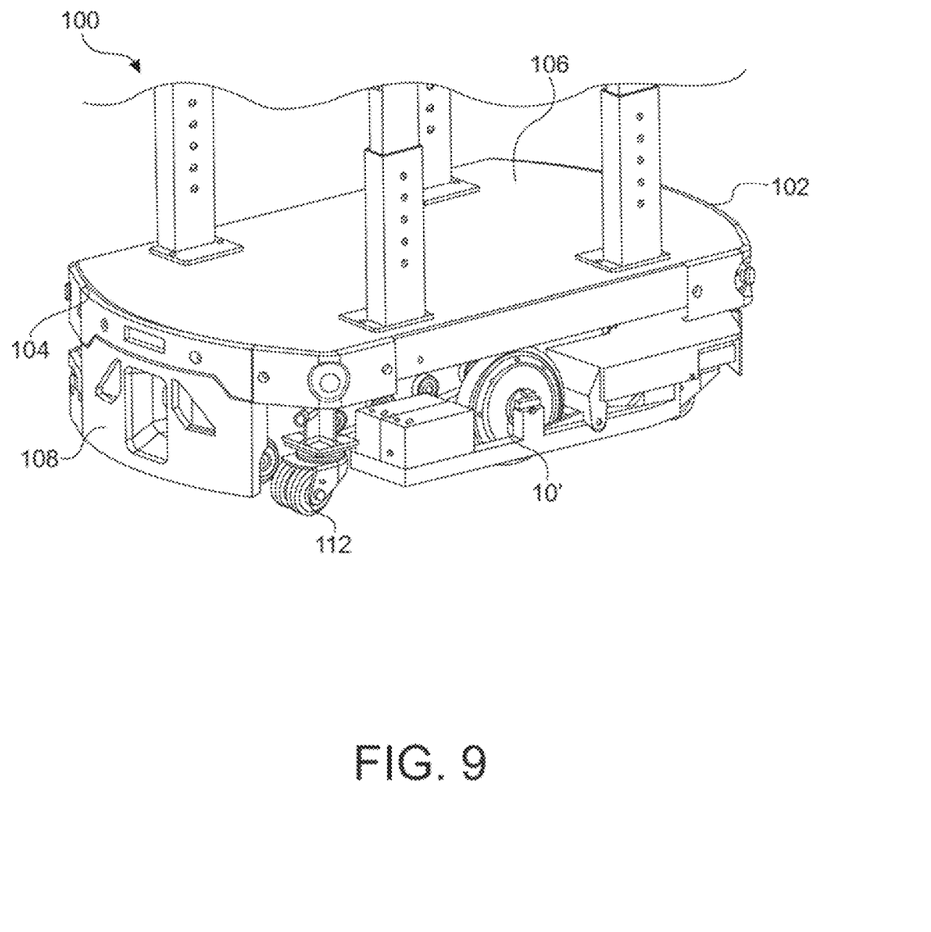
FIG. 9 illustrates a close-up view of the autonomous mobile robot shown in FIG. 8A with panels removed to show a position of prior art drive wheels.
Figure 10:
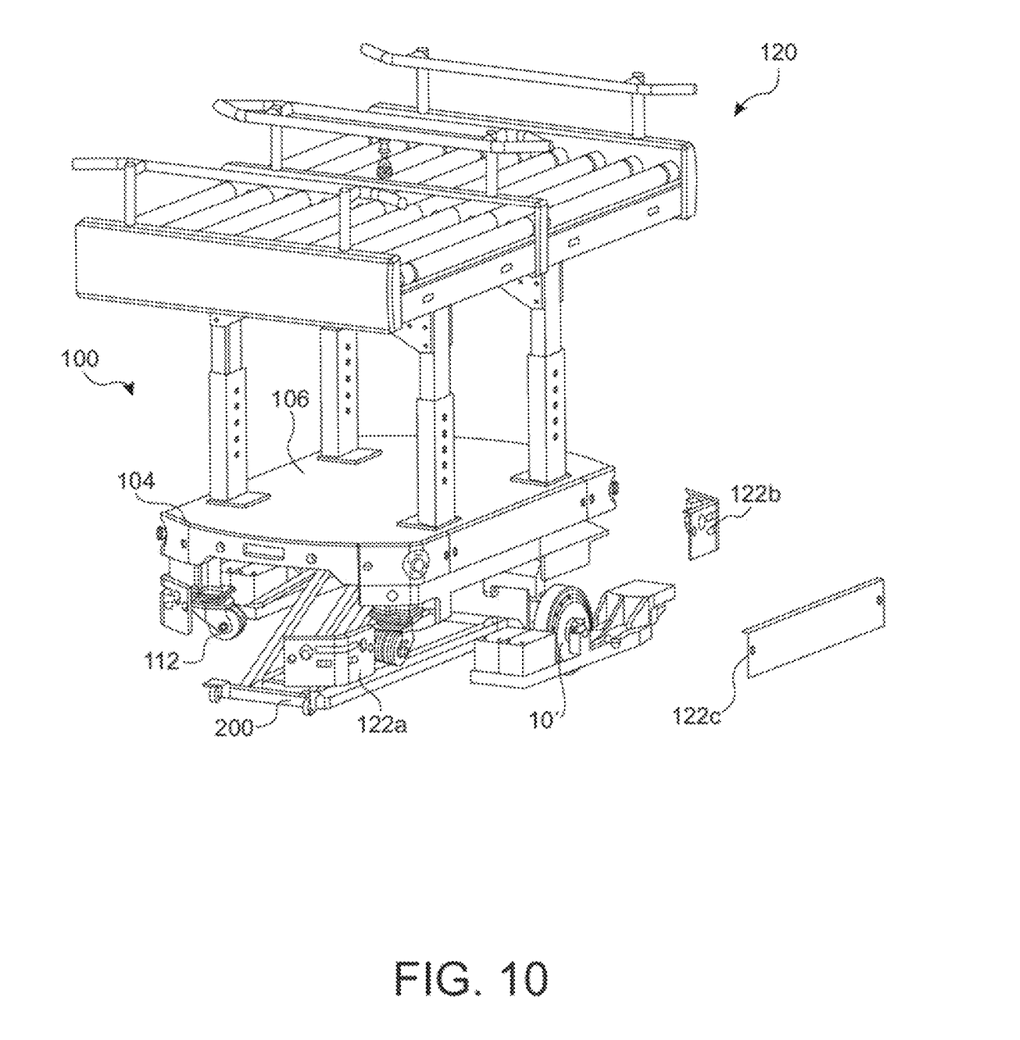
FIG. 10 illustrates a prior art means to replace the drive wheels of the autonomous mobile robot shown in FIG. 9.

The novel drive wheels 10 of the present disclosure provide a number of advantages over drive wheels of the prior art. For example, positioning of the attachment element such that they engage a vehicle through a front face of the drive wheels 10 allows easy installation of these wheels on the vehicle, such as the mobile base 100 discussed herein. With reference to FIGS. 9 and 10, a mobile base 100 comprising prior art drive wheels 10' is shown, which included attachment element on a top side thereof. Exchange of such drive wheels required that side panels (122a, 122b, 122c) of the mobile base 100 be removed so that the attachment element on a top of the drive wheel 10' could be accessed. This typically involved placing the mobile base 100 on a lift 200, as shown in FIG. 10, and elevating the mobile base 100 fully off the floor.

The presently disclosed drive wheels 10 not only provide a smaller, lighter weight design, but they are also much easier to install and replace. For example, access to the attachment element is through a front vertical face of the wheel, i.e., through the aligned holes 16 in the front cover 14 of the drive wheel 10 (i.e., holes 16 aligned with the axial bores 16*a*). Moreover, each drive wheel is attachable to the vehicle, such as the robots disclosed herein, by an attachment element configured to pass through the at least two axial bores of the central shaft and aligned connection bores on the vehicle (e.g., robot). According to certain aspects, the central shaft of each drive wheel may be asymmetrically shaped so that they may be uniquely positionable within a connection bore on the robot. Thus, when the drive wheel is mounted to the robot the shape of the shaft, or the attachment element (e.g., bolt, screw), or even additional pins (e.g., diamond dowel pins) can be used to locate the motor to the robot.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A direct drive wheel for use on an autonomous mobile robot, the wheel comprising:
    a brushless direct current motor comprising:
        a cylindrical outer rotor having a plurality of poles positioned on an inner surface thereof,
        a stationary central shaft having:
            a central axial bore and at least one radial wire passthrough bore in communication with the central axial bore, wherein a passageway formed by the at least one radial passthrough bore and central axial bore provides passage of wires from the plurality of electromagnets to a motor controller, and
            at least three axial bores evenly spaced about and radially offset from the central axial bore, each of the at least three axial bores configured to accept an attachment element providing connection to the autonomous mobile robot,
        a stationary stator mounted to the central shaft so that the rotor is configured for rotation about the stator, wherein the stator is spaced inwardly from the rotor and includes a plurality of electromagnets positioned on an outer circumference thereof, wherein a distance between the plurality of poles of the rotor and the plurality of electromagnets defines a magnetic clearance gap, and
        a cover attachable to an outer circumferential edge of the rotor, wherein rotation of the rotor and the cover about the central shaft is permitted by bearings positioned therebetween; and
    a tire positioned on an outer circumferential surface of the rotor and covering the stator and the bearings,
    wherein the stator is mounted to the central shaft so that the rotor is configured for rotation about the stator, and
    wherein the plurality of poles are constructed of permanent magnets alternatively magnetized north and south.

2. The wheel of claim 1, wherein the cover includes at least three holes alignable with the at least three axial bores to provide passage of the attachment element therethrough so that rotation of the cover with the rotor is not impeded by the attachment element.

3. The wheel of claim 1, wherein at least one end of the central shaft of the motor is asymmetrically shaped and is configured to be uniquely positionable within a connection bore on the autonomous mobile robot.

4. The wheel of claim 1, wherein the cover comprises an encoder magnet centrally located thereon, and the central shaft comprises an encoder read head positioned adjacent the encoder magnet, wherein wires from the encoder read head pass through the central bore and exit a side of the central bore opposite the cover.

5. An autonomous mobile robot comprising a motor controller, a battery, and at least two direct drive wheels, wherein the at least two direct drive wheels comprise:
    a brushless direct current motor comprising:
        a cylindrical outer rotor having a plurality of poles positioned on an inner surface thereof,
        a stationary central shaft having:
            a central axial bore and at least one radial wire passthrough bore in communication with the central axial bore, wherein a passageway formed by the at least one radial passthrough bore and central axial bore provides passage of wires from the plurality of electromagnets to a motor controller, and
            at least three axial bores evenly spaced about and radially offset from the central axial bore, each of the at least three axial bores configured to accept an attachment element providing connection to the autonomous mobile robot,
        a stationary stator mounted to the central shaft so that the rotor is configured for rotation about the stator, wherein the stator is spaced inwardly from the rotor and includes a plurality of electromagnets positioned on an outer circumference thereof, wherein a distance between the plurality of poles of the rotor and the plurality of electromagnets defines a magnetic clearance gap, and
        a cover attachable to an outer circumferential edge of the rotor, wherein rotation of the rotor and the cover about the central shaft is permitted by bearings positioned therebetween; and
    a tire positioned on an outer circumferential surface of the rotor and covering the stator and the bearings,
    wherein the cover comprises an encoder magnet centrally located thereon, and the central shaft comprises an encoder read head positioned adjacent the encoder magnet, wherein wires from the encoder read head pass through the central bore and exit a side of the central bore opposite the cover,
    wherein the stator is mounted to the central shaft so that the rotor is configured for rotation about the stator, and
    wherein the plurality of poles are constructed of permanent magnets alternatively magnetized north and south.

6. The robot of claim 5, wherein each direct drive wheel is attachable to the robot via attachment elements that pass fully through the cover and are positionable in the central shaft of each drive wheel and connection elements on the robot, wherein the motor controller is configured to provide power to groups of electromagnets of the plurality of electromagnets, and to apply a switching pattern to the groups to cause the outer rotor to rotate about the stator.

7. An autonomous mobile robot comprising:
a motor controller, a battery,
a plurality of sensors;
one or more processors;
a remote communication device;
a memory comprising computer program instructions executable by the one or more processors to receive data from and send data to a central server, process data received from each of the plurality of sensors, and output control signals to a mobile base; and
at least two direct drive wheels, each direct drive wheel comprising:
an inner stationary stator comprising a plurality of electromagnets positioned on an outer circumference thereof;
a cylindrical outer rotor surrounding the inner stationary stator and including:
a plurality of permanent magnets alternatively magnetized north and south and positioned on an inner circumferential surface of the rotor forming a magnetic clearance gap between the plurality of permanent magnets and the plurality of electromagnets, and
a tire positioned on an outer circumferential surface of the rotor; and
a stationary central shaft having a central axial bore, wherein the stator is mounted to the central shaft and the rotor is configured for rotation about the stator,
wherein the motor controller is configured to provide power to groups of electromagnets of the plurality of electromagnets, and to apply a switching pattern to the groups to cause the outer rotor to rotate about the stator.

8. The robot of claim 7, wherein the plurality of sensors include forward and rear facing cameras and a laser ranging device, wherein the laser ranging device is positioned in a horizontal cavity of the mobile base, the horizontal cavity located in one of the first and second ends of the mobile base and configured to afford the laser ranging device a 180-degree field of view on a horizontal plane elevated from and parallel with a floor surface.

9. The robot of claim 8, wherein the field of view of the laser ranging device is greater than 240-degrees and up to 270-degrees.

10. The robot of claim 7, wherein the central shaft of each of the direct drive wheels further includes at least one radial wire passthrough bore in communication with the central axial bore, the radial wire passthrough bore providing passage of wires from the plurality of electromagnets.

11. The robot of claim 7, wherein the rotor of each of the direct drive wheels includes a sidewall extending inward toward the central shaft, wherein rotation of the rotor about the central shaft is permitted by a plurality of bearings positioned between the sidewall and the central shaft.

12. The robot of claim 11, wherein each of the direct drive wheels further comprise:
a cover positioned opposite the sidewall of the rotor and attachable to an outer circumferential edge of the rotor such that the stator is positioned between the cover and the sidewall of the rotor, wherein rotation of the rotor and the cover about the central shaft is permitted by the plurality of bearings positioned therebetween.

13. The robot of claim 12, wherein the cover comprises an encoder magnet centrally located thereon, and the central shaft comprises an encoder read head positioned adjacent the encoder magnet, wherein wires from the encoder read head pass through the central bore and exit a side of the central bore opposite the cover.

14. The robot of claim 12, wherein the plurality of bearings comprises two sets of bearings, wherein a first of the two sets of bearings is positioned between the cover and the central shaft, and a second of the two sets of bearings is positioned between the sidewall of the rotor and the central shaft.

15. The robot of claim 7, wherein each direct drive wheel further comprises:
a front cover attachable to an outer circumferential edge of the rotor; and
a back cover attachable to an inner circumferential edge of the rotor opposite the outer circumferential edge, wherein the back cover extends inward from the rotor toward the central shaft such that the stator is positioned between the front cover and the back cover,
wherein rotation of the rotor about the central shaft is permitted by a first set of bearings positioned between an inner surface of the front cover and the central shaft and a second set of bearings positioned between an inner edge of the back cover and the central shaft.

16. The robot of claim 7, wherein the switching pattern of the motor controller comprises substantially simultaneously energizing by power from the battery at least two opposite electromagnets of the plurality of electromagnets, wherein the at least two opposite electromagnets are positioned on opposite sides of an axis about which the rotor is configured to rotate.

17. The robot of claim 7, wherein the motor controller is configured to control a speed and rotational direction of the outer rotor of each drive wheel separately based on signals sent from the one or more processors of the robot, wherein the signals sent from the robot are based in part of data received from the plurality of sensors of the robot.

18. The robot of claim 7, wherein the central shaft of each of the direct drive wheels includes:
at least two axial bores offset from the central axial bore and configured to accept an attachment element for connection to the autonomous mobile robot, and
at least one end that is asymmetrically shaped and configured to be uniquely positionable within a connection bore on the autonomous mobile robot.

19. The robot of claim 7, wherein the central shaft of each of the direct drive wheels comprises:
at least three axial bores evenly spaced about and radially offset from the central axial bore, each of the at least three axial bores configured to accept an attachment element providing connection to the autonomous mobile robot,
wherein the cover includes at least three holes alignable with the at least three axial bores to provide passage of the attachment element therethrough so that rotation of the cover with the rotor is not impeded by the attachment element.

* * * * *